US00RE47793E

(19) United States
(12) Reissued Patent
Ko et al.

(10) Patent Number: US RE47,793 E
(45) Date of Reissued Patent: Dec. 31, 2019

(54) METHOD FOR TRANSMITTING DEDICATED REFERENCE SIGNAL, AND METHOD FOR RECEIVING DEDICATED REFERENCE SIGNAL

(71) Applicant: Electronics and Telecommunications Research Institute, Daejeon (KR)

(72) Inventors: Young-Jo Ko, Daejeon (KR); Jae Young Ahn, Daejeon (KR); Bangwon Seo, Daejeon (KR)

(73) Assignee: Electronics and Telecommunications Research Institute, Daejeon-si (KR)

(21) Appl. No.: 15/461,397

(22) Filed: Mar. 16, 2017

Related U.S. Patent Documents

Reissue of:
(64) Patent No.: 8,983,479
Issued: Mar. 17, 2015
Appl. No.: 12/769,215
Filed: Apr. 28, 2010

(30) Foreign Application Priority Data

Apr. 28, 2009 (KR) ..... 10-2009-0036967
Jun. 23, 2009 (KR) ..... 10-2009-0055892

(51) Int. Cl.
*H04W 72/12* (2009.01)

(52) U.S. Cl.
CPC ..... *H04W 72/12* (2013.01)

(58) Field of Classification Search
CPC ..... H04B 7/024
USPC ..... 455/450
See application file for complete search history.

(56) References Cited

U.S. PATENT DOCUMENTS 5,960,365 A * 9/1999 Leih et al. ..... 455/552.1
8,812,017 B2 * 8/2014 Kangas ..... G01S 5/02 455/456.1
2005/0095985 A1 5/2005 Hafeoz
2007/0253465 A1 11/2007 Muharemovic et al.
2009/0046793 A1 * 2/2009 Love et al. ..... 375/260
2009/0252077 A1 * 10/2009 Khandekar et al. ..... 370/312
2010/0189038 A1 * 7/2010 Chen ..... H04L 1/0001 370/328

(Continued)

FOREIGN PATENT DOCUMENTS

KR 1020090059364 6/2009
KR 1020090059364 A 6/2009

(Continued)

*Primary Examiner* — Catherine M Tarae

(57) ABSTRACT

Provided are a method of transmitting a dedicated reference signal (DRS), a method of receiving a DRS, and a feedback method of a terminal. The method of transmitting a DRS includes determining a DRS transmitting resource for at least one terminal which is a target of transmission, and transmitting the DRS using the determined transmission resource and notifying the terminal of information about layer used by the terminal. The method of receiving a DRS includes determining a DRS receiving resource, receiving information about layer used by a terminal from a serving cell base station, and receiving the DRS for the terminal using the determined reception resource and the information about layer. Accordingly, a terminal can find the position and sequence of its DRS. In particular, in the case of multi-user multiple input multiple output (MU-MIMO) or joint scheduling, it is possible to prevent or remove signal interference using the DRS of another terminal.

10 Claims, 6 Drawing Sheets

(56) References Cited

U.S. PATENT DOCUMENTS

| | | | | |
|---|---|---|---|---|
| 2010/0238984 | A1* | 9/2010 | Sayana et al. | 375/219 |
| 2010/0296473 | A1* | 11/2010 | Kim et al. | 370/329 |
| 2011/0044223 | A1* | 2/2011 | Kim et al. | 370/312 |
| 2011/0299625 | A1* | 12/2011 | Hooli et al. | 375/295 |

FOREIGN PATENT DOCUMENTS

| | | | |
|---|---|---|---|
| KR | 1020090101760 | | 9/2009 |
| KR | 1020090101760 | A | 9/2009 |

* cited by examiner

METHOD FOR TRANSMITTING DEDICATED REFERENCE SIGNAL, AND METHOD FOR RECEIVING DEDICATED REFERENCE SIGNAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[CLAIM FOR PRIORITY] *CROSS-REFERENCES*

This application *is a reissue application of U.S. Pat. No. 8,983,479 issued on Mar. 17, 2015, which issued from U.S. patent application Ser. No. 12/769,215 filed on Apr. 28, 2010, which* claims priority to Korean Patent Applications No. 10-2009-0036967 filed on Apr. 28, 2009 and No. 10-2009-0055892 filed on Jun. 23, 2009 in the Korean Intellectual Property Office (KIPO), the entire contents of which are hereby incorporated by reference.

BACKGROUND

1. Technical Field

Example embodiments of the present invention relate in general to a method of transmitting a dedicated reference signal (DRS), a method of receiving a DRS, and a feedback method of a terminal, and more specifically to a DRS transmitting method of a base station and a DRS receiving method of a terminal when single user multiple-input multiple-output (SU-MIMO) transmission or multi-user MIMO (MU-MIMO) transmission is performed for single point transmission or coordinated multi-point transmission (CoMP).

2. Related Art

Wireless communication systems employ a MIMO scheme to increase the frequency efficiency of wireless resources. For effective MIMO, a reference signal (RS) needs to be appropriately transmitted and received. The RS is needed to demodulate a transmitted signal and also to extract MIMO channel state information (CSI). The CSI is extracted by a receiver and transferred to a transmitter, and the transmitter generates an appropriate transmission signal using the CSI and transmits the transmission signal to another receiver.

Also, in general MIMO transmission and reception, as many orthogonal RSs as the number of transmitting layers are needed. In conventional third generation partnership project (3GPP) long term evolution (LTE) release (Rel)-8, an RS referred to as a cell-specific RS (CRS) is used in common for CSI extraction and demodulation.

In other words, since 3GPP LTE Rel-8 supports up to four antennas in a downlink, RSs for the four antennas are used to demodulate received data and also to measure and feed back CSI to a transmitter. As mentioned above, these RSs are CRSs and used for all users in a cell. Meanwhile, in a 3GPP LTE-advanced system supporting up to eight antennas in a downlink, the number of required RSs increases with an increase in the number of multiple antennas. Thus, RS overhead also increases, which is a factor deteriorating system performance.

For this reason, in LTE-advanced systems, it has been determined to prevent the increase of RS overhead and the deterioration of system performance by separately using an RS for measuring CSI and an RS for data demodulation instead of using a conventional Rel-8 CRS structure, and standardization is under way.

A demodulation RS (DM-RS) is used to demodulate a physical dedicated shared channel (PDSCH) over which data is transmitted, and a CSI-RS is used to generate the CSI of a downlink wireless channel.

In particular, a DM-RS is an RS dedicated to a specific terminal, and present in a resource block allocated to the UE. The DM-RS undergoes the same precoding as data transmitted over the corresponding PDSCH and is transmitted.

When a cell has a plurality of transmitting antennas, the following precoding MIMO scheme can be used. When the number of transmitting antennas of the cell is $N_T$, a precoding vector has a length of $N_T$. One precoding vector is used to transmit one symbol. In other words, when a base station wants to transmit M data symbols using one resource element (RE), M precoding vectors are used.

When the symbols transmitted by the base station are indicated by $S_i$ (i=1, . . . , and M<=$N_T$), signals $Q_i$ (i=1, . . . , and $N_T$) finally transmitted by an i-th transmitting antenna are expressed by Equation 1 below.

[Equation 1]

$$\vec{Q} = \begin{bmatrix} Q_1 \\ Q_2 \\ \vdots \\ Q_N \end{bmatrix} = \begin{bmatrix} P_{11} & \cdots & P_{1M} \\ P_{21} & \cdots & P_{2M} \\ \vdots & & \vdots \\ P_{N_T 1} & \cdots & P_{N_T M} \end{bmatrix} \begin{bmatrix} S_1 \\ S_2 \\ \vdots \\ S_M \end{bmatrix} = \begin{bmatrix} \vec{P_1} & \cdots & \vec{P_2} \end{bmatrix} \begin{bmatrix} S_1 \\ S_2 \\ \vdots \\ S_M \end{bmatrix}$$

Here, $$\vec{P_i} = \begin{bmatrix} P_{1i} \\ P_{2i} \\ \vdots \\ P_{N_T i} \end{bmatrix} (i = 1, 2, \ldots, \text{and } M)$$

is a precoding vector corresponding to an i-th transmission symbol $S_i$ (i=1, . . . , and M).

A DM-RS undergoes the same precoding as data and is transmitted. When reference symbols are indicated by $X_l$ (l=1, . . . , and M), an RS $Q_i^{(l)}$ finally transmitted for each reference symbol $X_l$ by an i-th transmitting antenna is expressed by Equation 2 below.

[Equation 2]

$$\vec{Q^{(l)}} = \begin{bmatrix} Q_1^{(l)} \\ Q_2^{(l)} \\ \vdots \\ Q_{N_T}^{(l)} \end{bmatrix} = \vec{P_l} X_l$$

$$(l = 1, \ldots, \text{and } M)$$

When the number of symbols simultaneously transmitted by a base station is M, M precoding vectors are used, M DM-RSs are needed to estimate the channel of a terminal, and each RS undergoes the same precoding as the corresponding transmission symbol.

When a base station simultaneously transmits M data symbols using one RE, data symbols transmitted to a specific terminal during one transmission time interval (TTI) can be grouped into M layers. In other words, an i-th layer denotes a symbol group consisting of i-th transmission symbols of respective REs.

To estimate a channel using the DM-RS or CSI-RS of a terminal, the terminal needs to know the positions of REs through which the RSs are transmitted and an RS sequence used as an RS. At this time, different cells may configure DM-RSs and CSI-RSs to occupy different positions (i.e., show different patterns) in a time-frequency resource region and be orthogonal to each other.

A DRS of antenna port 5 defined in a current 3GPP LTE Rel-8 system is configured in the same format as a DM-RS of the aforementioned LTE-advanced system.

FIG. 1 shows disposition of time-frequency resources for illustrating the pattern of an antenna port 5-DRS of conventional LTE Rel-8.

A terminal determines the position of an RE through which an RS of antenna port 5 is transmitted according to the physical layer cell identity (PCI) of a serving cell, and determines an RS sequence on the basis of the PCI and the radio network temporary identifier (RNTI) of the terminal. Thus, the terminal can specify the position of a DRS of antenna port 5 and a DRS sequence using the PCI of the serving cell and the RNTI and receive the DRS of antenna port 5 and the DRS sequence.

However, CoMP technology is expected to be introduced to LTE-advanced or the following next-generation mobile communication, and each terminal needs to receive a DM-RS transmitted from another cell as well as a DM-RS transmitted from the serving cell of the terminal itself and perform channel estimation.

Also, when MU-MIMO is applied to single cell transmission (single point transmission), a terminal needs to receive the DM-RSs of other terminals receiving data from the same cell together with the terminal itself, estimate interference caused by the other terminals, and prevent or remove an interference signal to improve performance. This is because LTE-advanced supports dual or more layer beamforming and RSs for two or more users can be mapped to the same RE, unlike the antenna port 5 RS of conventional Rel-8 shown in FIG. 1 in which only beamforming for a single user is considered and RSs for two or more users are not mapped to the same RE.

SUMMARY

Accordingly, example embodiments of the present invention are provided to substantially obviate one or more problems due to limitations and disadvantages of the related art.

Example embodiments of the present invention provide a dedicated reference signal (DRS) transmitting method in which when single point transmission is performed, a target terminal can find a layer used by the terminal itself, and receive the demodulation reference signals (DM-RSs) of terminals receiving data from the same cell together with the terminal to prevent or remove an interference signal transmitted by another terminal.

Example embodiments of the present invention also provide a DRS transmitting method in which when coordinated multi-point transmission (CoMP) is performed, a target terminal can find a layer used by the terminal itself, and receive a DM-RS transmitted from another cell as well as a DM-RS transmitted from the serving cell of the terminal itself to perform channel estimation.

Example embodiments of the present invention also provide a DRS receiving method in which a terminal receiving single point transmission or CoMP can receive DM-RSs of terminals receiving data from the same cell together with the terminal itself to prevent or remove an interference signal transmitted by another terminal, or receive a DM-RS transmitted from another cell as well as a DM-RS transmitted from the serving cell of the terminal itself to perform channel estimation.

Example embodiments of the present invention also provide a method for a terminal receiving CoMP to provide scalable and flexible feedback while minimizing feedback overhead.

In some example embodiments, a method for a base station to transmit a DRS to a terminal by single point transmission includes: determining a transmission resource for transmitting a DRS for the terminal which is a target of the single point transmission; and transmitting the DRS to the terminal using the determined transmission resource, and notifying the terminal of information about layer used by the terminal.

The transmission resource for transmitting the DRS may be at least one of a time-frequency resource position transmitting the DRS and the sequence of the DRS.

When the single point transmission is single user multiple input multiple output (SU-MIMO) transmission, in notifying the terminal of information about layer used by the terminal, the information about layer may include the number of layers used by the terminal.

When the single point transmission is multi-user MIMO (MU-MIMO) transmission, determining a transmission resource for transmitting a DRS may include determining the transmission resource for transmitting the DRS for the terminal not using terminal-specific information of the terminal but using cell-specific information of the base station, and notifying the terminal of information about layer used by the terminal may include separately notifying the terminal of information about layer used by another terminal in addition to the information about layer used by the terminal.

When the single point transmission is MU-MIMO transmission, determining a transmission resource for transmitting a DRS may include determining the transmission resource for transmitting the DRS using virtual terminal-specific information shared among terminals having the base station as a serving cell, and notifying the terminal of information about layer used by the terminal may include separately notifying the terminal of information about layer used by another terminal in addition to the information about layer used by the terminal. In this case, the virtual terminal-specific information may be reserved to be shared among the base station and terminals, or transmitted to terminals by signaling of the base station.

In other example embodiments, a method for a base station to transmit a DRS to a terminal by CoMP in which a plurality of cells participate includes: determining a transmission resource for transmitting a DRS for at least one terminal which is a target of the CoMP; and transmitting the DRS to the terminal using the determined transmission resource, and notifying the terminal of information about layer used by the terminal.

When the CoMP is joint processing SU-MIMO transmission or coordinated scheduling transmission, in notifying the terminal of information about layer used by the terminal, the information about layer may include the number of layers used by the terminal.

When the CoMP is joint processing MU-MIMO transmission, determining a transmission resource for transmitting a DRS may include determining the transmission resource using virtual cell-specific information shared among the cells and virtual terminal-specific information shared among terminals receiving the CoMP of the cells, and notifying the terminal of information about layer used by the terminal may include separately notifying the terminal of information about layer used by another terminal in addition to the information about layer used by the terminal.

The virtual cell-specific information and the virtual terminal-specific information may be reserved in advance to be shared among the cells and terminals, or shared among the cells and terminals by signaling between the base station and another base station and signaling between the base station and the terminals.

When the CoMP is coordinated scheduling transmission, notifying the terminal of the information about layer used by the terminal may further include additionally notifying the terminal of cell-specific information about a cell interfering with the terminal among cells participating in the coordinated scheduling transmission other than a serving cell and the number of layers used by the interfering cell, and the information about layer may include the number of layers used by the terminal.

In still other example embodiments, a method for a terminal, which is a target of single point transmission or CoMP, to receive a DRS and data includes: determining a reception resource for receiving a DRS for the terminal; receiving information about layer used by the terminal from a serving cell base station; and receiving the DRS for the terminal using the determined reception resource and the information about layer.

When the single point transmission is SU-MIMO transmission or the CoMP is joint processing SU-MIMO transmission or coordinated scheduling transmission, in receiving information about layer used by the terminal, the information about layer may include the number of layers used by the terminal.

When the CoMP is coordinated scheduling transmission, receiving information about layer used by the terminal may include receiving cell-specific information about a cell interfering with the terminal among a plurality of cells participating in the coordinated scheduling transmission other than a serving cell and the number of layers used by the interfering cell in addition to the number of layers used by the terminal.

When the single point transmission is MU-MIMO transmission or the CoMP is joint processing MU-MIMO transmission, determining a reception resource for receiving a DRS may include determining the reception resource for receiving the DRS using virtual terminal-specific information shared among terminals, which are targets of the MU-MIMO transmission, and receiving information about layer used by the terminal may include separately receiving information about layer used by another terminal in addition to the information about layer used by the terminal.

When the CoMP is joint processing MU-MIMO transmission, determining a reception resource for receiving a DRS may include determining the reception resource for receiving the DRS using virtual cell-specific information shared among a plurality of cells performing the CoMP and the terminal and virtual terminal-specific information shared among the cells and terminals receiving the CoMP of the cells, and receiving information about layer used by the terminal may include separately receiving information about layer used by another terminal in addition to the information about layer used by the terminal.

In yet other example embodiments, an explicit feedback method of a terminal receiving CoMP from base stations includes: determining whether the CoMP is one of coordinate scheduling transmission, non-coherent joint processing, and coherent joint processing; when the CoMP is one of coordinate scheduling transmission, non-coherent joint processing, and coherent joint processing, feeding back main eigenmatrices ($V_i$, i=S, A, . . . ) for respective channels between base stations (S, A, . . . ) participating in the CoMP and the terminal; and when the CoMP is coherent joint processing, feeding back phase correction matrices ($D_i$, i=S, A, . . . ) for respective channels for adjusting a phase of a transmission signal between the base stations (S, A, . . . ) participating in the CoMP and the terminal in addition to the main eigenmatrices ($V_i$, i=S, A, . . . ) for the respective channels between the base stations (S, A, . . . ) participating in the CoMP and the terminal.

The main eigenmatrices ($V_i$, i=S, A, . . . ) for the respective channels may be obtained by eigen decomposition of channel covariance matrices $R_S$ of channel coefficient matrices $H_S$ of the respective channels or singular value decomposition (SVD) of the respective channel coefficient matrices $H_S$ of the respective channels.

The phase correction matrices ($D_i$, i=S, A, . . . ) for the respective channels may adjust the phase of the transmission signal of the base stations (S, A, . . . ) participating in the CoMP by precoding transmission signals of the respective base stations (S, A, . . . ) participating in the CoMP together with the main eigenmatrices ($V_i$, i=S, A, . . . ) for the respective channels, and are selected so that an inter-cell term of an effective reception signal of the terminal has a highest data transmission rate.

In yet other example embodiments, an implicit feedback method of a terminal receiving CoMP from base stations includes: determining whether the CoMP is one of coordinate scheduling transmission, non-coherent joint processing, and coherent joint processing; when the CoMP is one of coordinate scheduling transmission, non-coherent joint processing, and coherent joint processing, determining main eigenmatrices ($V_i$, i=S, A, . . . ) for respective channels between base stations (S, A, . . . ) participating in the CoMP and the terminal, selecting matrices the most similar to the respective determined main eigenmatrices ($V_i$, i=S, A, . . . ) from a predefined codebook to select matrix indices ($W_i$, i=S, A, . . . ), and feeding back the selected matrix indices ($W_i$, i=S, A, . . . ); and when the CoMP is coherent joint processing, selecting matrix indices ($X_i$, i=S, A, . . . ) of phase correction matrices for respective channels for adjusting a phase of a transmission signal between the base stations (S, A, . . . ) participating in the CoMP and the terminal from a predefined codebook in addition to the matrix index ($W_i$, i=S, A, . . . ), and feeding back the matrix index ($W_i$, i=S, A, . . . ) and the selected matrix index ($X_i$, i=S, A, . . . ).

The main eigenmatrices ($V_i$, i=S, A, . . . ) for the respective channels may be obtained by eigen decomposition of channel covariance matrices $R_S$ of channel coefficient matrices $H_S$ of the respective channels or SVD of the channel coefficient matrices $H_S$ of the respective channels, and the matrix indices ($W_i$, i=S, A, . . . ) may be determined by selecting the matrices the most similar to the respective determined main eigenmatrices ($V_i$, i=S, A, . . . ) from the predefined codebook.

The matrix indices ($X_i$, i=S, A, . . . ) of the phase correction matrices for the respective channels may be determined by precoding transmission signals between the respective base stations (S, A, . . . ) participating in the CoMP and the terminal together with matrices selected by the matrix indices ($W_i$, i=S, A, . . . ) from the predefined codebook to select phase correction matrices for adjusting transmission signals of the base stations (S, A, . . . ) participating in the CoMP from the predetermined codebook so that an inter-cell term of an effective reception signal of the terminal has a highest data transmission rate.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS OF THE PRESENT INVENTION

Figure 1:
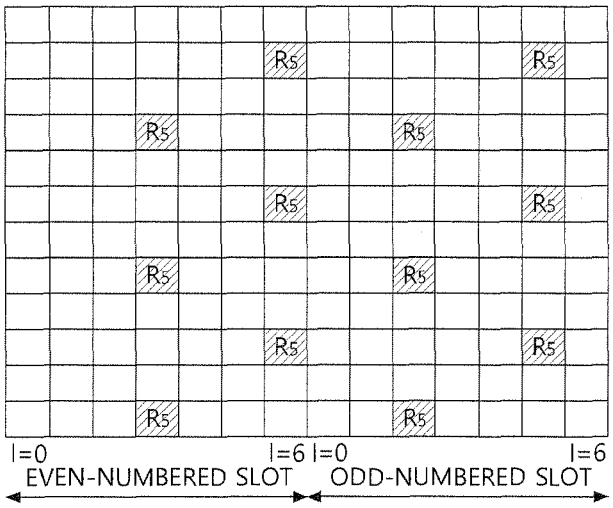
FIG. 1 shows disposition of time-frequency resources for illustrating the pattern of an antenna port 5-dedicated reference signal (DRS) of conventional long term evolution (LTE) release (Rel)-8.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc. ).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

The term "terminal" may refer to a mobile station (MS), user equipment (UE), user terminal (UT), wireless terminal, access terminal (AT), subscriber unit, subscriber station (SS), wireless device, wireless communication device, wireless transmit/receive Unit (WTRU), moving node, mobile, or other terms. Various example embodiments of a terminal may include a cellular phone, a smart phone having a wireless communication function, a personal digital assistant (PDA) having a wireless communication function, a wireless modem, a portable computer having a wireless communication function, a photographing apparatus such as a digital camera having a wireless communication function, a gaming apparatus having a wireless communication function, a music storing and playing appliance having a wireless communication function, an Internet home appliance capable of wireless Internet access and browsing, and also portable units or terminals having a combination of such functions, but are not limited to these.

The term "base station" generally denotes a fixed point communicating with a terminal, and may be referred to as Node-B, eNode-B, base transceiver system (BTS), access point, and other terms. Also, one or more cells can be present at one base station. One cell can include one or more sectors.

A dedicated reference signal (DRS) transmitting method that can be applied to next-generation mobile communication following long term evolution (LTE)-advanced will be described below according to 1) a single point transmission environment and 2) a coordinated multi-point transmission (CoMP) environment. The technical idea of a demodulation (DM)-reference signal (RS) transmitting method in a single point transmission environment and that of a DM-RS transmitting method in a CoMP environment are not mutually exclusive, and a common technical idea between the two methods can be used in common in both of the environments.

Meanwhile, the single point transmission environment denotes a transmission environment in which a single base station or cell participates, and the CoMP environment denotes a transmission environment in which two or more base stations or cells participate. Here, a "point" denotes a transmission point from which something is transmitted, and includes a transmission point such as an access point, remote radio equipment (RRE), or a relay as well as a base station referred to as node-B, eNode-B, BTS, and so on.

1) The Case of Single-Point Transmission

A terminal receiving data from a single point finds the transmission position and sequence of a DM-RS from the physical layer cell identity (ID) (PCI) of a serving cell performing transmission and the radio network temporary identifier (RNTI) of the terminal itself. This is the same method applied to antenna port 5 defined in the third generation partnership project (3GPP) LTE release 8 standard described in Related Art.

In the case of single user MIMO (SU-MIMO), the position (or pattern) of a resource element (RE) through which a DM-RS is transmitted is defined in advance according to the number of layers. Thus, when the number of allocated layers is obtained, the terminal can know the positions of DM-RSs corresponding to the respective layers. Also, the sequence of a DM-RS can be found from the PCI of the serving cell and the RNTI of the terminal in the case of SU-MIMO. Thus, when a base station notifies the terminal of the number of transmitted layers using downlink control information (DCI), the terminal can find the position and sequence of a DM-RS allocated to the terminal itself.

In multi-user MIMO (MU-MIMO) transmission, a plurality of terminals are scheduled on the same resource block, and thus a signal transmitted to each terminal interferes with other terminals.

When a terminal knows the position of a DM-RS corresponding to an interfering layer and a sequence applied to the DM-RS, the terminal can estimate the channel of the interfering layer from the position and sequence. Then, the terminal can improve its receiving performance using a reception technique of preventing or removing an interference signal transmitted by another terminal.

To this end, in the case of MU-MIMO, (i) a base station separately notifies a terminal of the layers allocated to the terminal and a layer used by another terminal using DCI, thereby notifying the terminal of the position of a DM-RS of the layer used by the other terminal. In other words, since the position of a DM-RS can be specified according to layer, the terminal can know its DM-RS position and the DM-RS position of another terminal when the layer allocated to the terminal and a layer allocated to the other terminal is reported.

(ii) the base station may notify each terminal of a sequence applied to a DM-RS corresponding to a layer used by another terminal so that the terminal can estimate the channel of an interfering layer from the applied sequence.

To implement (ii), the following methods can be used.

(A) In MU-MIMO transmission, dependency on terminal-specific information (e.g., RNTI) is removed from a process of determining a DM-RS sequence. In other words, it is possible to know the sequence from only cell-specific information such as a cell ID. In this case, each terminal can know a sequence applied to a DM-RS corresponding to a layer used by another terminal without additional information.

(B) In MU-MIMO transmission, a DM-RS is generated using a virtual RNTI applied to terminals in common instead of terminal-specific information (e.g., RNTI) used for generating a DM-RS sequence, and a terminal is notified of the virtual RNTI. At this time, the virtual RNTI can be reported through DCI or additional signaling.

In the aforementioned methods, it is possible to use a reception technique of preventing or removing an interference signal transmitted by another terminal. Also, a serving cell can notify a terminal of the modulation order of a layer used by another terminal.

Figure 2:
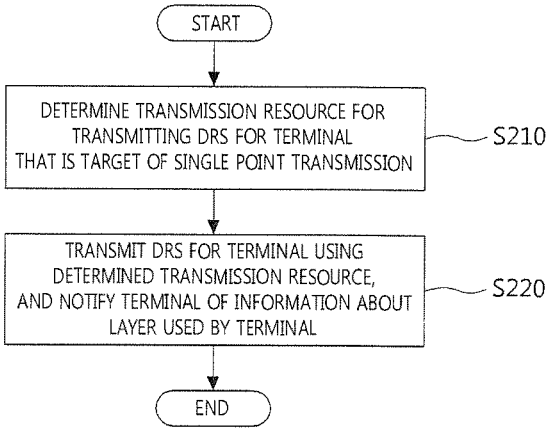
FIG. 2 is a flowchart illustrating a demodulation reference signal (DM-RS) transmitting method that can be used for single point transmission according to an exemplary embodiment of the present invention.

FIG. 2 is a flowchart illustrating a DM-RS transmitting method that can be used for single point transmission according to an exemplary embodiment of the present invention.

Referring to FIG. 2, a method for a base station to transmit a DRS to a terminal by single point transmission may include operation S210 of determining a transmission resource for transmitting a DRS for a terminal, which is a target of single point transmission, and operation S220 of transmitting the DRS to the terminal using the determined transmission resource and notifying the terminal of information about layer used by the terminal.

Here, in operation S210 of determining a transmission resource for transmitting a DRS for at least one terminal, the transmission resource may be at least one of a time-frequency resource position (i.e., a pattern) transmitting the DRS and the sequence of the DRS.

In operation S210, when the single point transmission is MU-MIMO transmission, the transmission resource for transmitting the DRS for the at least one terminal can be determined not using terminal-specific information of each terminal (e.g., RNTI) but using cell-specific information of a serving cell (e.g., the PCI of the serving cell). In this way, DM-RSs having the same sequence can be transmitted to all terminals that belong to the serving cell.

Also, when the single point transmission is MU-MIMO transmission, the transmission resource for transmitting the DRS for the at least one terminal may be determined using virtual terminal-specific information (e.g., a virtual RNTI) shared among terminals having the base station as a serving cell. When the sequence of an RS is determined using terminal-specific information shared among terminals having the same base station as a serving cell, all the terminals belonging to the serving cell can use the same sequence, like the preceding method.

At this time, the virtual terminal-specific information can be transmitted to the terminals using terminal-specific information reserved in advance to be shared among the terminals and the serving cell or by signaling (broadcasting or radio resource control (RRC) signaling) of the base station.

On the other hand, in operation S210, when the single point transmission is SU-MIMO transmission, the terminal may know the positions of DM-RSs corresponding to respective allocated layers from the number of the allocated layers and find the sequences of the DM-RSs from the PCI of the serving cell and the RNTI of the terminal itself. Thus, in operation S220 to be described below, the serving cell base station notifies the terminal of the number of the layers by including the number of the layers in information about layer used by the terminal, so that the terminal can find the positions and sequences of the DM-RSs allocated to the terminal itself.

Next, in operation S220, the DRS can be transmitted to the terminal using the transmission resource determined in operation S210, and the terminal can be notified of the information about layer used by the terminal itself.

In other words, the terminal can be notified of the information about layer used by the terminal itself using DCI, and so on.

At this time, when the single point transmission is SU-MIMO transmission, it is sufficient to include the number of the layers used by the terminal in the information about layer used by the terminal. On the other hand, when the single point transmission is MU-MIMO transmission, the terminal may need to be separately notified of information about layer used by another terminal, which is a target of the MU-MIMO transmission together with the terminal, in addition to the information about layer used by the terminal. In other words, in this case, the terminal may not need to be notified of information about the number of layers but need to be separately notified of the numeral of layers used by each terminal.

Consequently, the information about the DM-RSs and layers transmitted in operation S220 using the transmission resource (time-frequency position and transmission sequence) determined in operation S210 is received by the terminal, and the terminal finds the layers that belong to the terminal itself using the information about layer received in operation S220. In the case of MU-MIMO transmission, the received information can be used to distinguish a layer that belongs to another terminal and remove interference.

2) The Case of CoMP

The case of CoMP in which a plurality of cells participate will be described below.

In general, a terminal located at a cell boundary suffers strong interference from another cell, and thus has a limited data transmission rate. CoMP is technology for increasing the data transmission rate of a terminal located at a cell boundary, and is a candidate for application to a next-generation mobile communication system following 3GPP LTE-advanced or other next-generation mobile communication systems.

Inter-cell cooperative communication for an orthogonal frequency-division multiple access (OFDMA) downlink under discussion for an LTE-advanced system can be classified into the following two fields: joint processing and coordinated scheduling. In joint processing, a terminal receives data from a plurality of transmission points. In coordinated scheduling, a terminal receives data from one transmission point, and scheduling, precoding or beamforming of the terminal is performed by cooperation of a plurality of cells.

Figure 3:
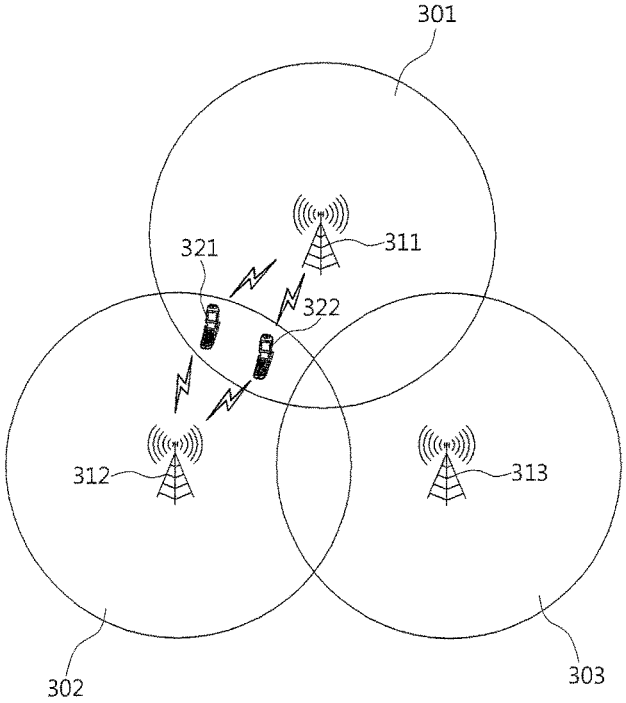
FIG. 3 is a conceptual diagram illustrating joint processing among coordinated multi-point transmission (CoMP) techniques.

FIG. 3 is a conceptual diagram illustrating joint processing among CoMP techniques.

Referring to FIG. 3, a first terminal 321 receives data that is simultaneously transmitted by a base station 311 of a first cell 301 and a base station 312 of a second cell 302. Meanwhile, when MU-MIMO is applied to CoMP, data for a second terminal 322 can be scheduled on the same resource block as the first terminal 321.

In other words, assuming that there is the first terminal 321 alone in FIG. 3, the situation corresponds to SU-MIMO of CoMP, and assuming that the first terminal 321 and the second terminal 322 coexist and data is simultaneously mapped to the same resource block, the situation corresponds to MU-MIMO of CoMP.

Here, the serving cell of the first terminal 321 and the serving cell of the second terminal 322 may be the first cell 301 or the second cell 302.

Figure 4:
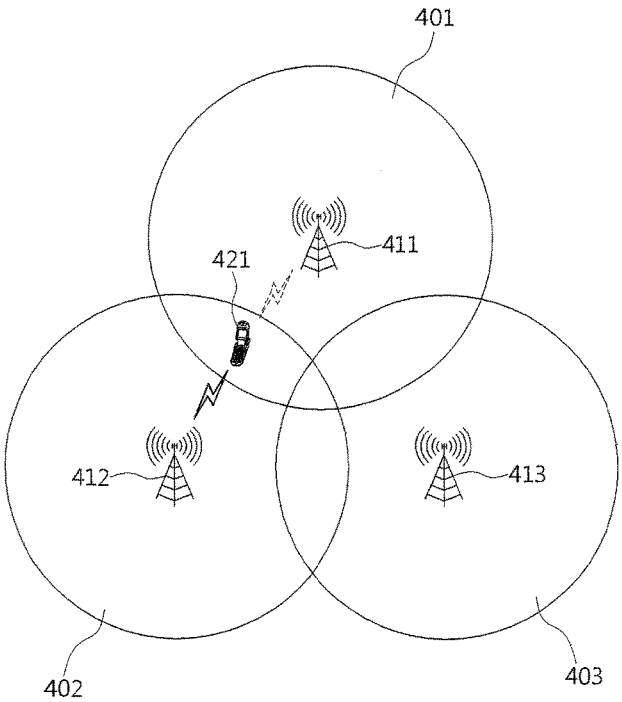
FIG. 4 is a conceptual diagram illustrating coordinated scheduling among CoMP techniques.

FIG. 4 is a conceptual diagram illustrating coordinated scheduling among CoMP techniques.

Referring to FIG. 4, a terminal 421 receives transmission under cooperation of a base station 411 of a first cell 401 and a base station 412 of a second cell 402. However, data is received from the second cell 402 only, and transmission from the first cell 401 is merely regarded as interference. In other words, the serving cell of the terminal 421 is the second cell 402. The base station 411 of the first cell 401 and the base station 412 of the second cell 402 perform scheduling and beamforming for reducing interference in transmission from the second cell 402 to the terminal 421 caused by transmission from the first cell 401 in cooperation with each other.

FIGS. 3 and 4 will be referred to again.

The RS transmission structure of 3GPP LTE antenna port 5 illustrated in FIG. 1 described above is appropriate for single cell transmission, but has a problem in being applied as is to a DM-RS structure used for coordinated cell transmission. Joint processing and coordinated scheduling will be described below.

A DM-RS needs to satisfy two conditions so that a terminal receiving joint processing can perform channel estimation for multiple cells. First, DM-RS symbol sequences used by different transmission cells need to be identical. Second, transmission positions of DM-RSs used by different transmission cells need to be identical.

To meet these conditions, the following methods can be used.

The Case of Joint Processing SU-MIMO

This method can be applied to joint processing SU-MIMO, that is, joint processing illustrated in FIG. 3.

It is assumed that only the first terminal 321 exists in FIG. 3. When the serving cell of the terminal 321 is the first cell 301, the cells 301 and 302 participating in joint processing determine a DM-RS position and sequence using cell-specific information (PCI) of the first cell 301 and terminal-specific information (RNTI) of the terminal 321 and transmit a DM-RS.

In other words, although the serving cell of the terminal 321 is the first cell 301, the second cell 302 also determines a DM-RS position and sequence using the cell-specific information (PCI) of the first cell 301 and an RNTI that the first cell 301 has assigned to the terminal 321, and transmits a DM-RS.

In the case of joint processing SU-MIMO, the position (or pattern) of a RE through which a DM-RS is transmitted is defined in advance according to the number of layers. Thus, when the number of used layers is obtained, a terminal can know the positions of DM-RSs corresponding to the respective layers. To reduce the complexity of the terminal, the DM-RS transmission positions and pattern may be designed to be the same as those in single cell transmission. A serving cell can notify the terminal of the number of layers transmitted to the terminal using DCI.

The Case of Joint Processing MU-MIMO

The case of joint processing MU-MIMO means a case in which joint processing exemplified by FIG. 3 is executed in MU-MIMO manner. In other words, joint processing MU-MIMO denotes a case in which, for example, the first terminal 321 and the second terminal 322 are targets for joint processing MU-MIMO transmission in FIG. 3.

As mentioned above, a method for cells participating in joint processing to transmit a DM-RS using a DM-RS position and sequence corresponding to the serving cell ID and RNTI of a terminal has no problem in SU-MIMO transmission but has a problem as described below in MU-MIMO transmission.

When the serving cell of the first terminal 321 is the first cell 301 and the serving cell of the second terminal 322 is the second cell 302, a serving cell ID and RNTI corresponding to the first terminal 321 and those corresponding to the second terminal 322 may differ from each other. Thus, when the aforementioned DM-RS structure in SU-MIMO transmission is used, a serving cell needs to notify the corresponding terminal of the serving cell IDs and RNTIs of interfering terminals using DCI.

In this method, there may be conflict between DM-RSs transmitted to respective terminals, and overhead is caused by significant DCI transmission. For these reasons, the method is not preferable.

To solve these problems, virtual cell-specific information (e.g., virtual PCI) and virtual terminal-specific information (e.g., virtual RNTI) can be introduced in multi-cell MU-MIMO transmission.

All cells participating in joint processing MU-MIMO transmit DM-RSs using the same virtual cell ID and virtual RNTI. Each cell can broadcast a virtual cell PCI and virtual. RNTI to a terminal. Alternatively, each cell can determine a plurality of virtual PCIs and a plurality of virtual RNTIs in advance, and notify a terminal of a used virtual PCI and virtual RNTI when downlink data transmission occurs.

Multi-cells participating in joint processing generate and transmit DM-RS positions and sequences using the same virtual cell PCI and the same virtual RNTI.

A serving cell separately notifies the corresponding terminal of a layer allocated to the terminal and a layer used by another terminal together with a virtual PCI and a virtual RNTI set for the terminal. Each terminal can find the position of a DM-RS and a used sequence from a virtual PCI and virtual RNTI received from its serving cell. Also, each terminal can estimate the channel of another layer, and thus can use a reception technique of preventing or removing an interference signal transmitted by a layer allocated to another terminal. Furthermore, the serving cell may notify a terminal of the modulation order of a layer used by another terminal.

In the description above, terminals that are targets of joint processing MU-MIMO have different serving cells. However, when two or more terminals receiving joint processing MU-MIMO transmission using the same resource always have the same serving cell, that is, the first terminal 321 and the second terminal 322 have the same serving cell, the first cell 301, a simpler method described below can be used.

(1) Dependency on terminal-specific information (RNTI) is removed from a process of determining a DM-RS sequence. In other words, it is possible to know the sequence from a PCI.

(2) In DM-RS transmission, virtual terminal-specific information (a virtual RNTI) of each terminal is used instead of the terminal-specific information (RNTI). The virtual RNTI can be broadcast within a cell in advance, or reported as DCI to the terminal.

Also, a serving cell may separately notify a terminal of a layer allocated to the terminal and a layer used by another terminal using DCI. In this case, a channel can be estimated from a DM-RS corresponding to the layer used by the other terminal, and thus it is possible to use a reception technique of preventing or removing an interference signal transmitted by another terminal. Also, the serving cell can notify the terminal of the modulation order of the layer used by the other terminal.

The Case of Coordinated Scheduling

In the case of coordinated scheduling, each of a serving cell and coordinated cells transmits a DM-RS to the position of the DM-RS corresponding to its cell-specific information (PCI) using the terminal-specific information (RNTI) of the corresponding terminal. The serving cell notifies the terminal of the number of layers allocated to the terminal using DCI.

Additionally, the serving cell can notify the terminal of the PCI of a neighboring cell causing strong interference and the number of layers used by the neighboring cell.

In other words, referring back to FIG. 4, the first cell 401 that is the serving cell of the terminal 421 can notify the terminal 421 of the PCI of the second cell 402 that is a neighboring cell causing strong interference and the number of layers used by the second cell 402.

Since a terminal can know the number of DM-RSs used by a neighboring cell and the positions of the DM-RSs from the PCI and the number of layers of the neighboring cell and estimate the channel of an interference signal transmitted from the neighboring cell, it is possible to use a reception technique of preventing or removing the interference signal. Additionally, the terminal can be notified of the modulation orders of the layers used by the neighboring cell.

Figure 5:
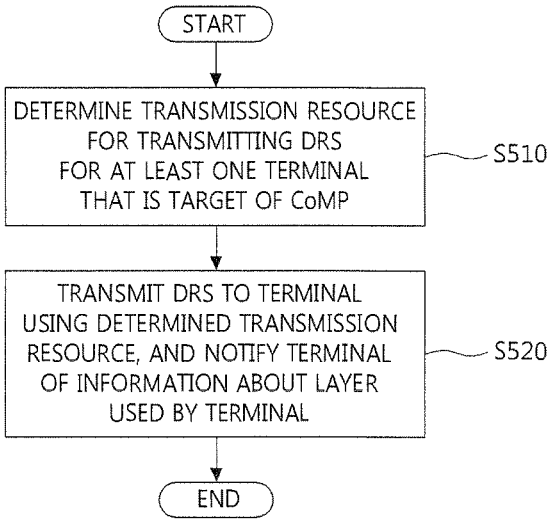
FIG. 5 is a flowchart illustrating a DM-RS transmitting method that can be used for CoMP according to an exemplary embodiment of the present invention.

FIG. 5 is a flowchart illustrating a DM-RS transmitting method that can be used for CoMP according to an exemplary embodiment of the present invention.

Referring to FIG. 5, a method for a base station to transmit a DRS to a terminal by CoMP according to an exemplary embodiment of the present invention may include operation S510 of determining a transmission resource for transmitting a DRS for at least one terminal, which is a target of CoMP, and operation S520 of transmitting the DRS to the terminal using the determined transmission resource and notifying the terminal of information about layer used by the terminal.

Here, in operation S510 of determining a transmission resource for transmitting a DRS for at least one terminal, the transmission resource may be at least one of a time-frequency resource position (i.e., a pattern) transmitting the DRS and the sequence of the DRS.

In operation S510 of determining a transmission resource for transmitting a DRS, when the CoMP is joint processing MU-MIMO transmission, the transmission resource can be determined using virtual cell-specific information shared among a plurality of cells and virtual terminal-specific information shared among terminals receiving coordinated transmission of the cells.

Here, the virtual cell-specific information can be reserved in advance to be shared among the cells and terminals, or can be shared among the cells and terminals by signaling between the base station and another base station and between the base station and the terminals. Also, the virtual terminal-specific information can be reserved in advance to be shared among the cells and terminals, or can be shared among terminals by signaling between the base station and another base station and between the base station and the terminals.

On the other hand, in operation S510, when the CoMP is SU-MIMO transmission or coordinated scheduling transmission, the terminal may know the positions of DM-RSs corresponding to the respective layers from the number of layers that a serving cell allocates to the terminal and find the sequences of the DM-RSs from the PCI of the serving cell and the RNTI of the terminal itself. Thus, in operation S520 to be described below, a serving cell base station notifies the terminal of the number of the layers by including the number of the layers in information about layer used by the terminal, so that the terminal can find the positions and sequences of the DM-RSs allocated to the terminal itself.

Next, in operation S520, the DRS can be transmitted to the terminal using the transmission resource determined in operation S510, and the terminal can be notified of the information about layer used by the terminal itself.

In other words, the terminal can be provided with the information about layer used by the terminal itself using DCI, and so on.

At this time, when the CoMP is SU-MIMO transmission, it is sufficient to include the number of the layers used by the terminal in the information about layer used by the terminal.

On the other hand, when the CoMP is MU-MIMO transmission, the terminal may need to be separately notified of information about layer used by another terminal, which is a target of the MU-MIMO transmission together with the terminal, in addition to the information about layer used by the terminal. In other words, in this case, the terminal may not need to be notified of information about the number of layers but need to be separately notified of the numeral of layers used by each terminal.

Also, when the CoMP is coordinated scheduling transmission, the information about layer includes the number of the layers used by the terminal, and the terminal can be additionally notified of the cell-specific information of a cell interfering with the terminal among a plurality of cells participating in the coordinated scheduling transmission other than a serving cell and the number of layers used by the interfering cell. In other words, in coordinated scheduling transmission, a terminal finds the number and positions of DM-RSs used by an interfering neighboring cell from the cell-specific information and the number of layers of the neighboring cell to estimate an interference signal transmitted by the neighboring cell and can use a reception technique of preventing or removing the interference signal.

Consequently, the DRS transmitted in operation S520 using the transmission resource (time-frequency position and transmission sequence) determined in operation S510 is received by the terminal, and the terminal finds the layers that belong to the terminal itself using the information about layer received in operation S520. In the case of MU-MIMO transmission or coordinated scheduling transmission, the received information can be used to distinguish layers that belong to another terminal and remove interference.

3) DRS Receiving Method of Terminal

Figure 6:
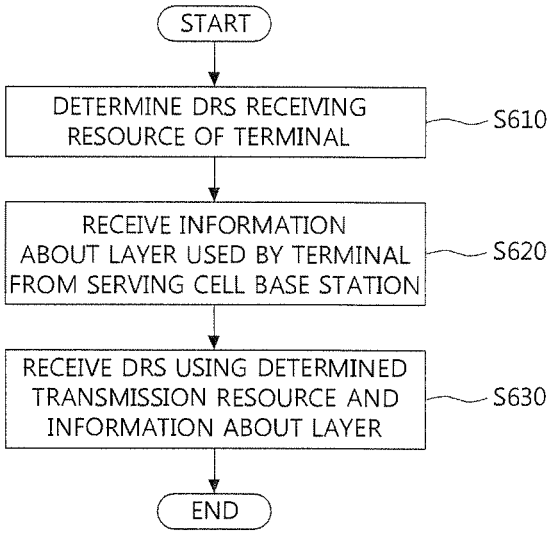
FIG. 6 is a flowchart illustrating a DRS receiving method according to an exemplary embodiment of the present invention.

FIG. 6 is a flowchart illustrating a DRS receiving method according to an exemplary embodiment of the present invention.

A DRS receiving method described below with reference to FIG. 6 is a method for a terminal to receive a DRS transmitted according to the DRS transmitting method described above with reference to FIGS. 2 and 5 according to an exemplary embodiment of the present invention.

Referring to FIG. 6, the DRS receiving method according to an exemplary embodiment of the present invention is a DRS receiving method of a terminal that is a target of single point transmission or CoMP. The DRS receiving method may include operation S610 of determining a reception resource for receiving the DRS for a terminal, operation S620 of receiving information about layer used by the terminal from a serving cell base station, and operation S630 of receiving the DRS for the terminal itself using the determined reception resource and the information about layer.

In operation S610 of determining a reception resource for receiving the DRS for a terminal, the reception resource can be at least one of a time-frequency resource position (i.e., a pattern) for receiving the DRS and the sequence of the DRS.

In operation S610, when single point transmission that is MU-MIMO transmission is received or joint processing MU-MIMO transmission is received, the reception resource for receiving the DRS can be determined using virtual terminal-specific information shared among terminals that are targets of MU-MIMO transmission.

This determination of the reception resource based on terminal-specific information corresponds to a case in which a base station determines a DRS transmitting resource using virtual terminal-specific information shared among cells instead of terminal-specific information that each cell assigns to the terminal in the aforementioned operations S210 and S510 of FIGS. 2 and 5.

Also, when joint processing MU-MIMO transmission is received, the reception resource for receiving the DRS can be determined using virtual cell-specific information shared among cells performing the joint processing and the terminal and virtual terminal-specific information shared among the cells and terminals receiving the joint processing of the cells.

In other words, in the case of joint processing MU-MIMO transmission, the reception resource for receiving a DRS may be determined using only virtual terminal-specific information when terminals receiving joint processing have the same serving cell, and using virtual cell-specific information as well as the virtual terminal-specific information when the terminals receiving joint processing have different serving cells. Needless to say, the reception resource for receiving a DRS can be determined using both of virtual cell-specific information and virtual terminal-specific information even if terminals receiving joint processing have the same serving cell.

This determination of the reception resource based on virtual cell-specific information and virtual terminal-specific information corresponds to a case in which a base station determines a DRS transmitting resource using virtual cell-specific information and virtual terminal-specific information in the aforementioned operations S210 and S510 of FIGS. 2 and 5.

When joint processing SU-MIMO transmission is received, the reception resource may be determined not using the terminal-specific information of the terminal but using the cell-specific information of the serving cell of the terminal. In this case, the terminal-specific information (e.g., RNTI) is excluded from a process in which the terminal determines the reception resource for receiving the DRS. In other words, a reception resource for receiving a DRS for each terminal is determined not using the terminal-specific information (e.g., RNTI) of the terminal but using the cell-specific information of the serving cell (e.g., PCI of the serving cell). In this way, upon the determination of an RS sequence, all terminals belonging to the serving cell can be determined to use the same RS sequence. This determination of the reception resource based on only cell-specific information corresponds to a case in which a base station determines a DRS transmitting resource not using terminal-specific information but using cell-specific information only in the aforementioned operation S210 of FIG. 2.

In operation S620, information about layer used by the terminal is received from a serving cell base station.

The information about layer used by the terminal can be received using DCI, etc. from the serving cell base station.

Here, when single point SU-MIMO transmission, joint processing SU-MIMO transmission, or coordinated scheduling transmission is received, the information about layer used by the terminal can include the number of layers used by the terminal. In particular, when coordinated scheduling transmission is received, the terminal can receive cell-specific information about a cell interfering with the terminal among a plurality of cells participating in the coordinated scheduling transmission other than a serving cell and the number of layers used by the interfering cell in addition to the number of layers used by the terminal.

On the other hand, when single point MU-MIMO transmission or joint processing MU-MIMO transmission is received, the terminal can separately receive information about layer used by another terminal in addition to the information about layer used by the terminal.

Finally, in operation S630, the terminal finds and receives the DRS for the terminal itself using the transmission resource determined in operation S610 and the layer information received in operation S620.

When coordinated scheduling transmission or MU-MIMO transmission is received, the terminal separately receives the information about layer used by the terminal and the information about layer used by another terminal. Thus, the terminal finds the position and sequence of a DM-RS used by the other terminal using the received information, and can use a reception technique of preventing or removing interference from the other terminal.

4) Effective Feedback Method of Terminal

A feedback operation for a terminal to effectively perform the aforementioned DRS transmitting method will be described below.

(1) The Case of Single-Point Transmission

When $H_S$ denotes an $M_R \times M_T$ channel coefficient matrix indicating a wireless channel between a terminal and a serving cell and $P_S$ denotes an $M_R \times L$ precoding matrix that the serving cell applies to the terminal, a reception signal at the terminal can be expressed by Equation 3 below.

$$y = H_S P_S s + n \quad \text{[Equation 3]}$$

Here, s denotes a symbol vector that has a magnitude of $L \times 1$ and is transmitted to a terminal by a serving cell, and n denotes a noise vector that has a magnitude of $M_R \times 1$ and includes both of neighboring cell interference and Gaussian thermal noise.

When a channel covariance matrix is expressed by $R_S = H_S^H H_S$ and a matrix consisting of eigenvectors having an eigenvalue other than 0 is indicated by $V_S^1$, $V_S^1$ can be obtained from an eigen decomposition $R_S = V_S \Lambda_S V_S^H$ of $R_S = H_S^H H_S$ or a singular value decomposition (SVD) $H_S = U_S \Sigma_S V_S^H$ ($\Sigma_S^H \Sigma_S = \Lambda_S$) of $H_S$.

$$R_S = [V_S^1 \;\; V_S^0] \begin{bmatrix} \Lambda_S^1 & 0 \\ 0 & 0 \end{bmatrix} [V_S^1 \;\; V_S^0]^H = V_S^1 \Lambda_S^1 V_S^{1H} \left( H_S = U_S^1 \Sigma_S^1 V_S^{1H} \right) \quad \text{[Equation 4]}$$

When a transmitting side uses $V_S^1$ as a precoder, the reception signal of the terminal is expressed by $y = H_S V_S^1 s + n$. By multiplying the reception signal by a channel estimation value estimated from a DRS, the following valid reception signal can be obtained:

$$\begin{aligned} \tilde{y} &= (\overline{H_S V_S^1})^H \cdot y \\ &= (\overline{H_S V_S^1})^H H_S V_S^1 s + (\overline{H_S V_S^1})^H n \\ &\approx \Lambda_1 \cdot s + (\overline{H_S V_S^1})^H n. \end{aligned} \quad \text{[Equation 5]}$$

Such a transmitting and receiving method has been known as an excellent method capable of achieving a channel capacity. To enable the aforementioned single cell transmission and reception, the following can be used in particular as a feedback for precoding at a transmitting side among feedbacks that a terminal needs to transmit in a frequency-division duplex (FDD) system:

(i) a channel coefficient matrix $H_S$ (ii) a channel covariance matrix $R_S = H_S^H H_S$ (iii) a main eigenmatrix $V_S^1$ of a channel.

While these three types of matrices are used for explicit channel feedback, a matrix that is the most similar to the eigenmatrix of (iii) is found from a predefined codebook, and the corresponding precoding matrix index (PMI) is fed back for implicit channel feedback. When the codebook is indicated by $S^{(A)} = \{w_n, n=1, 2, \ldots\}$, the PMI can be expressed as Equation 6 below.

$$W_S = \arg \min_{w \in S^{(A)}} D(V_S^1, w) \quad \text{[Equation 6]}$$

Here, $D(V_S^1, w)$ denotes a "distance" between $V_S^1$ and w.

(2) The Case of Coordinated Scheduling Transmission

When a terminal receives coordinated scheduling transmission from two cells as illustrated in FIG. 2, a signal received by the terminal can be expressed by Equation 7 below.

$$y = H_S P_S s_S + H_A P_A s_A + n \quad \text{[Equation 7]}$$

When $H_i$ (i=S, A) denotes the channel coefficient matrix of a terminal and cell i and $P_i$ (i=S, A) denotes a precoder applied to cell i, an effective reception signal obtained by multiplying the received signal by a channel estimation value estimated from a DRS can be expressed by Equation 8 below.

$$\begin{aligned} \tilde{y} &= \overline{H_S P_S}^H \cdot y \\ &= \left( \overline{H_S P_S}^H H_S P_S s_s + \overline{H_S P_S}^H H_A P_A s_A \right) + \overline{H_S P_S}^H \cdot n \end{aligned} \quad \text{[Equation 8]}$$

When $P_S$ is an eigenmatrix consisting of eigenvectors of a channel $H_S$, an intra-cell term $\overline{H_S P_S}^H H_S P_S s_S$ related to only a serving cell becomes approximately a diagonal matrix. In other words, $\overline{H_S P_S}^H H_S P_S s_S \approx (V_S^H)(V_S \Sigma_S^2 V_S^H)(V_S) = \Sigma_S^2$.

On the other hand, in order to cause little interference with the terminal, cell A can select $P_A$ to belong to a null space of $H_A$ or a space formed by eigenvectors corresponding to 0 or very small eigenvalues among eigenvectors corresponding to eigenvalues obtained by SVD of $H_A$. In other words, $\overline{H_S P_S}^H H_A P_A s_A \approx 0$.

To implement the aforementioned coordinated scheduling transmission, the terminal can use one of the following as a feedback:

(i) channel coefficient matrices $H_S$ and $H_A$ (ii) channel covariance matrices $R_S = H_S^H H_S$ and $R_A = H_A^H H_A$ and (iii) main eigenmatrices $V_S$ and $V_A$ of a channel (obtained from eigen decompositions $R_S = V_S \Lambda_S V_S^H$ and $R_A = V_A \Lambda_A V_A^H$).

These three types of matrices are used for explicit channel feedback, and the eigenmatrices of (iii) can be applied to codebook-based implicit channel feedback. In this case when the codebook is indicated by, $S^{(i)} = \{w_n, n=1, 2, \ldots\}$ (i=S, A) a PMI can be expressed by Equation 9 below.

$$W_S = \arg \min_{w \in S^{(S)}} D(V_S, w)$$

$$W_A = \arg \min_{w \in S^{(A)}} D(V_A, w) \quad \text{[Equation 9]}$$

(3) The Case of Joint Processing—Coherent Joint Processing

In coherent joint processing, cells participating in joint processing artificially adjust the phases of signals transmitted by the respective cells to obtain the maximum effect in consideration of the phases. On the other hand, in non-coherent joint transmission, a phase between internal antennas of each cell is adjusted without consideration of phase adjustment between cells.

When a terminal receives joint processing from two cells as shown in FIG. 3, a signal received by the terminal can be expressed by Equation 10 below.

$$y = H_S P_S s + H_A P_A s + n \quad \text{[Equation 10]}$$

When $H_i$ (i==S, A) denotes a channel coefficient matrix of a terminal and cell i, and $P_i$ (i=S, A) denotes a precoder applied to cell i, an effective reception signal obtained by multiplying the received signal by a channel estimation value estimated from a DRS can be expressed by Equation 11 below.

$$\tilde{y} = (\overline{H_S P_S + H_A P_A})^H \cdot y \quad \text{[Equation 11]}$$

$$= \left( \begin{array}{c} \overline{H_S P_S}^H H_S P_S + \overline{H_A P_A}^H H_A P_A + \\ \overline{H_A P_A}^H H_S P_S + \overline{H_S P_S}^H H_A P_A \end{array} \right) s + (\overline{H_S P_S + H_A P_A})^H \cdot n$$

The following two coherent precoding methods can be used.

(A) Global Precoding

An eigenvector matrix V is obtained from a joint channel $$H = \begin{bmatrix} H_A^H \\ H_B^H \end{bmatrix}$$

of two cells. V is used as a precoder.

$$R = V \Lambda V^H \quad \text{[Equation 12]}$$

$$= \begin{bmatrix} H_S^H \\ H_A^H \end{bmatrix} [H_S \quad H_A]$$

$$= \begin{bmatrix} R_S & R_{SA} \\ R_{SA}^H & R_A \end{bmatrix}$$

Here, $R_{ij} = H_i^H H_j$, and the other transmission and reception process is similar to the case of single cell transmission.

(B) Local Precoding Plus Phase Correction

Cells participating in joint processing determine precoding in consideration of only wireless channels between the respective cells and the terminal. Phase correction is determined on the assumption of determined precoding of the respective cells in consideration of the wireless channels between all the cells participating in joint processing and the terminal. Precoding at cell i (i=S, A) can be expressed by Equation 13 below.

$$P_S = V_S D_S$$

$$P_A = V_A D_A \quad \text{[Equation 13]}$$

Here, $D_S^H D_S = 1$ and $D_A^H D_A = 1$ and (unitary). Intra-cell terms related to only the channels of respective individual cells become approximately diagonal matrices irrelevant to selection of $D_S$ and $D_A$ when $D_S$ and $D_A$ are limited to diagonal matrices. In other words, the intra-cell terms are expressed by Equation 14 below.

$$\overline{H_S P_S}^H H_S P_S \approx (D_S^H V_S^H)(V_S \Sigma_S^2 V_S^H)(V_S D_S) \quad \text{[Equation 14]}$$

$$= (D_S^H \Sigma_S^2 D_S)$$

$$= \Sigma_S^2$$

Likewise, $\overline{H_A P_A}^H H_A P_A \approx\approx (D_A^H \Sigma_A^2 D_A) = \Sigma_A^2$.

The matrices $D_S$ and $D_A$ for phase correction may be determined so that an inter-cell term $\overline{H_A P_A}^H H_S P_S + \overline{H_S P_S}^H H_A P_A$ can provide the highest data transmission rate.

To implement the aforementioned joint processing, the terminal can use one of the following as an explicit channel feedback:

(i) channel coefficient matrices $H_S$ and $H_A$ (ii) channel covariance matrices $R_S = H_S^H H_S$, $R_A = H_A^H H_A$, and an inter-cell matrix $R_{SA} = H_S^H H_A$.

(iii) a main eigenmatrix V (obtained from an eigen decomposition $$R = V \Lambda V^H$$

$$= \begin{bmatrix} H_S^H \\ H_A^H \end{bmatrix} [H_S \quad H_A]).$$

(iv) main eigenmatrices $V_S$ and $V_A$, and phase correction matrices $D_S$ and $D_A$.

In the case of implicit feedback, (iii) and (iv) are corrected, precoders that are the most similar to the corrected matrices are found, and the corresponding indices are fed back. When a codebook for global precoding is indicated by $S^{(SA)}$, a codebook for local precoding of cell i is indicated by $S^{(i)}$(i=S, A), and a codebook for phase correction is indicated by $X^{(i)}$(i=S, A), an implicit feedback of the terminal can be expressed as follows:

(v) a precoding matrix for global precoding is $$W = \arg \min_{w \in S^{(SA)}} D(V, w)$$

(vi) precoding matrices for local precoding and phase correction are $$W_S = \arg \min_{w \in S^{(S)}} D(V_S, w) \text{ and } W_A = \arg \min_{w \in S^{(A)}} D(V_A, w),$$

and a matrix index for phase correction is $$(X_S, X_A) = \arg \min_{x_S \in X^{(S)},\ x_A \in X^{(A)}} R(H, x_S, x_A \mid W_S, W_A).$$

Here, R denotes an overall data transmission rate.

Preferable Feedback Structure of Terminal

Consequently, in a terminal employing a DM-RS transmitting method according to an exemplary embodiment of the present invention, feedback of the terminal for downlink transmission such as single cell transmission, coordinated scheduling transmission, and coherent joint processing has characteristics as described below.

First, coordinated scheduling transmission and non-coherent joint processing can use the same terminal feedback.

Second, when terminal feedback used for single cell transmission is simply scaled up to a plurality of cells, the terminal feedback can be used for coordinated scheduling and non-coherent joint processing.

Third, terminal feedback for coherent joint processing can be designed to include coordinated scheduling transmission or non-coherent joint processing. Local precoding and phase correction have the same content as terminal feedback for coordinated scheduling transmission or non-coherent joint processing except for a diagonal matrix for phase correction.

Terminal feedback may have the following two characteristics.

A first characteristic is scalability, which denotes that a transmitting side needs to be able to perform transmission using a part of content fed back by a terminal. For example, when a terminal performs feedback for joint processing in which three cells participate, a transmitting side may successfully receive feedbacks for only two cells. In this case, when the feedbacks have scalability, joint processing for the two cells can be performed using the feedbacks. Also, the transmitting side may use an additional terminal feedback to scale up the joint processing so that more cells can participate in the joint processing. For example, when a terminal transmits a feedback to a transmitting side for joint processing in which three cells participate and then additionally transmits a feedback for one cell, the transmitting side should be able to perform joint processing in which the four cells participate using the successfully received feedback information of the four cells.

A second characteristic is flexibility, which denotes that a plurality of transmission methods can be selected from a terminal feedback causing high overhead. For example, from a terminal feedback for coherent joint processing, a transmitting side should be able to select and perform coherent joint processing, non-coherent joint processing, coordinated scheduling transmission, or single cell transmission.

In Table 1 and Table 2, merits and demerits of the aforementioned explicit channel feedback and implicit channel feedback are arranged according to transmission methods.

TABLE 1

| Explicit Channel Feedback | | | | | |
|---|---|---|---|---|---|
| | | CoMP | | | |
| Explicit Feedback | Single Point Transmission | Coordinated Scheduling | Non-Coherent Joint Processing | Coherent Joint Processing | |
| (i) Channel Coefficient Matrix | $H_S$ $H_S$ | $H_i(i = S, A, \ldots)$ | $H_i(i = S, A, \ldots)$ | $H_i(i = S, A, \ldots)$ | High Overhead, Complete Scalability and Flexibility |
| (ii) Channel Covariance Matrix | $R_S$ $R_S$ | $R_i(i = S, A, \ldots)$ | $R_i(i = S, A, \ldots)$ | $R_i(i = S, A, \ldots) + R_{ij}(i \neq j, i, j = S, A, \ldots)$ | High Overhead, Complete Scalability and Flexibility |
| (iii) Eigenmatrix for Global Precoding | $V_S$ $V_S$ | $V_i(i = S, A, \ldots)$ | $V_i(i = S, A, \ldots)$ | $V_{joint}$ | Low Overhead, Partial Scalability and Flexibility |
| (iv) Local Precoding Eigenmatrix and Diagonal Matrix for Phase Correction | $V_S$ $V_S$ | $V_i(i = S, A, \ldots)$ | $V_i(i = S, A, \ldots)$ | $V_i(i = S, A, \ldots) + D_i(i = S, A, \ldots)$ | Medium Overhead, Complete Scalability and Flexibility |

TABLE 2

| Implicit Channel Feedback | | | | | |
|---|---|---|---|---|---|
| | | CoMP | | | |
| Implicit Feedback | Single Point Transmission | Coordinated Scheduling | Non-Coherent Joint Processing | Coherent Joint Processing | |
| (v) PMI for Global Precoding | $W_S$ | $W_i(i = S, A, \ldots)$ | $W_i(i = S, A, \ldots)$ | $W_{joint}$ | Multi-Cell Codebook Is Needed. Partial Scalability and Flexibility |

TABLE 2-continued

| Implicit Channel Feedback | | | | | |
|---|---|---|---|---|---|
| | | CoMP | | | |
| Implicit Feedback | Single Point Transmission | Coordinated Scheduling | Non-Coherent Joint Processing | Coherent Joint Processing | |
| (vi) PMI for Local Precoding and Phase Correction | $W_S$ | $W_i(i = S, A, \ldots)$ | $W_i(i = S, A, \ldots)$ | $W_i(i = S, A, \ldots) + X_i(i = S, A, \ldots)$ | Single Cell Codebook Is Needed. Complete Scalability and Flexibility |

Referring to Table 1 and Table 2 above, (i), (ii) and (iv) of Table 1 and (vi) of Table 2 satisfy both of scalability and flexibility. Also, (i) and (ii) of Table 1 increase the amount of feedback of a terminal, and, in comparison with (i) and (ii) of Table 1, (iv) of Table 1 has scalability and flexibility and maintains an appropriate amount of feedback. Furthermore, (vi) of Table 2 is based on the codebook of each cell and thus has scalability and flexibility while reducing the amount of feedback.

While the example embodiments of the present invention and their advantages have been described in detail, it should be understood that various changes, substitutions and alterations may be made herein without departing from the scope of the invention.

What is claimed is:

1. A *communication* method [for a base station to transmit a reference signal to a terminal], [the method] comprising:

transmitting, from [the] *a* base station, [a] *downlink control information* (*DCI*) *to a terminal, wherein the DCI includes* virtual terminal-specific information to the terminal;

generating, *by the base station,* a sequence [for the reference signal for the terminal by using] *based on* a physical *layer* cell identity (PCI) of a serving cell [of the terminal] and the virtual terminal-specific information; [and]

*generating, by the base station, a reference signal based on the sequence; and* transmitting, from the base station, the reference signal [using the sequence] to the terminal,

[wherein the virtual terminal-specific information is transmitted to the terminal by using downlink control information (DCI),] wherein the reference signal is a dedicated reference signal for the terminal.

2. The method of claim 1, [further comprising transmitting information about layer used by the terminal to the terminal] *wherein the reference signal is a user equipment specific* (*UE-specific*) *reference signal.*

3. The method of claim 1, wherein [the virtual terminal-specific information is shared by at least two terminals including the terminal and selected among plural values predefined for the at least two terminals] *the DCI is also transmitted to a second terminal and the reference signal is also transmitted to the second terminal.*

4. The method of claim 1, [wherein the virtual terminal-specific information is used for generating the sequence instead of a radio network temporary identifier (RNTI) of the terminal] *further comprising:*

*transmitting, from the base station, a virtual cell identity of the serving cell to the terminal;*

*generating, by the base station, another sequence based on the virtual cell identity and the virtual terminal-specific information;*

*generating, by the base station, another reference signal based on the another sequence; and*

*transmitting, from the base station, the another reference signal to the terminal.*

5. The method of claim 1, wherein the base station performs a single point transmission for the terminal.

6. A *communication* method [for a terminal to receive a reference signal from a base station], [the method] comprising:

receiving, [from the base station] *by a terminal*, [a] *downlink control information* (*DCI*) *from a base station, wherein the DCI includes* virtual terminal-specific information [from the base station];

[generating a sequence for the reference signal for the terminal by using a physical cell identity (PCI) of a serving cell of the terminal and the virtual terminal-specific information; and]

receiving, [from the base station] *by the terminal*, [the] *a* reference signal [by using the sequence] from the base station[.]*; and*

*obtaining, by the terminal, user data based on the reference signal, the virtual terminal-specific information and a physical layer cell identity* (*PCI*) *of a serving cell,*

[wherein the virtual terminal-specific information is received from the base station by using downlink control information (DCI),] wherein the reference signal is a dedicated reference signal for the terminal.

7. The method of claim 6, [further comprising receiving information about layer used by the terminal from the base station] *wherein the reference signal is a user equipment specific* (*UE-specific*) *reference signal.*

8. The method of claim 6, wherein [the virtual terminal-specific information is shared by at least two terminals including the terminal and selected among plural values predefined for the at least two terminals] *the DCI is also transmitted to a second terminal and the reference signal is also transmitted to the second terminal.*

9. The method of claim 6, [wherein the virtual terminal-specific information is used for generating the sequence instead of a radio network temporary identifier (RNTI) of the terminal] *further comprising:*

*receiving, by the terminal, a virtual cell identity of the serving cell from the base station;*

*receiving, by the terminal, another reference signal from the base station; and*

*obtaining, by the terminal, other user data based on the another reference signal, the virtual terminal-specific information and the virtual cell identity of the serving cell.*

10. The method of claim 6, wherein the terminal performs a single point reception from the base station.

[11. A method for a base station to transmit a reference signal to a terminal, the method comprising:

transmitting, from the base station, a virtual cell-specific information and a virtual terminal-specific information to the terminal;

generating a sequence for the reference signal for the terminal by using the virtual cell-specific information and the virtual terminal-specific information; and transmitting, from the base station, the reference signal using the sequence to the terminal, wherein the virtual cell-specific information is transmitted to the terminal by using downlink control information (DCI), wherein the reference signal is a dedicated reference signal for the terminal.]

[12. The method of claim 11, wherein the virtual cell-specific information is indicated by the down link control information among a plurality of cell identities.]

[13. The method of claim 11, wherein the virtual terminal-specific information is transmitted to the terminal by using a downlink control information (DCI).]

[14. The method of claim 11, further comprising transmitting information about layer used by the terminal to the terminal.]

[15. The method of claim 11, wherein the virtual cell-specific information is shared by at least two cells including a serving cell of the terminal.]

[16. The method of claim 11, wherein the virtual terminal-specific information is shared by at least two terminals including the terminal and selected among plural values predefined for the at least two terminals.]

[17. The method of claim 11, wherein the virtual cell-specific information is identical to or different from a physical cell identity (PCI) of a serving cell of the terminal and the virtual terminal-specific information is different from a radio network temporary identifier (RNTI) of the terminal.]

[18. The method of claim 11, wherein the base station performs a coordinated multi-point transmission for the terminal with other base station.]

[19. A method for a terminal to receive a reference signal from a base station, the method comprising:

receiving, from the base station, a virtual cell-specific information and a virtual terminal-specific information from the base station;

generating a sequence for the reference signal for the terminal by using the virtual cell-specific information and the virtual terminal-specific information; and receiving, from the base station, the reference signal by using the sequence from the base station, wherein the virtual cell-specific information is received from the base station by using downlink control information (DCI), wherein the reference signal is a dedicated reference signal for the terminal.]

[20. The method of claim 19, wherein the virtual cell-specific information is indicated by the down link control information among a plurality of cell identities.]

[21. The method of claim 19, wherein the virtual terminal-specific information is received from the terminal by using a downlink control information (DCI).]

[22. The method of claim 19, further comprising receiving information about layer used by the terminal from the base station.]

[23. The method of claim 19, wherein the virtual cell-specific information is shared by at least two cells including a serving cell of the terminal.]

[24. The method of claim 19, wherein the virtual terminal-specific information is shared by at least two terminals including the terminal and selected among plural values predefined for the at least two terminals.]

[25. The method of claim 19, wherein the virtual cell-specific information is identical to or different from a physical cell identity (PCI) of a serving cell of the terminal and the virtual terminal-specific information is different from a radio network temporary identifier (RNTI) of the terminal.]

[26. The method of claim 19, wherein the terminal performs a coordinated multi-point reception from a plurality of cells including a serving cell of the terminal.]

* * * * *